(12) United States Patent
Sage (10) Patent No.: US 8,156,535 B2
(45) Date of Patent: Apr. 10, 2012

(54) DATA RATE COMPRESSION DEVICE FOR CABLE TELEVISION RETURN PATH USING BANDPASS PUNCTURING

(75) Inventor: Gerald F. Sage, Chico, CA (US)

(73) Assignee: Finsar Corporation, Sunnyvale, CA (US)

( * ) Notice: Subject to any disclaimer, the term of this patent is extended or adjusted under 35 U.S.C. 154(b) by 1906 days.

(21) Appl. No.: 10/102,619

(22) Filed: Mar. 19, 2002

(65) Prior Publication Data

US 2003/0154495 A1    Aug. 14, 2003

Related U.S. Application Data

(60) Provisional application No. 60/357,071, filed on Feb. 12, 2002.

(51) Int. Cl.
*H04N 7/173* (2011.01)
(52) U.S. Cl. ........................... 725/121; 725/122
(58) Field of Classification Search ........... 725/118–129
See application file for complete search history.

(56) References Cited

U.S. PATENT DOCUMENTS

| | | | |
|---|---|---|---|
| 4,513,426 A | 4/1985 | Jayant | |
| 4,631,746 A * | 12/1986 | Bergeron et al. | 704/217 |
| 4,809,271 A | 2/1989 | Kondo et al. | |
| 4,862,392 A | 8/1989 | Steiner | |
| 4,918,446 A | 4/1990 | Yagi | |
| 5,014,309 A | 5/1991 | West, Jr. | |
| 5,036,315 A | 7/1991 | Gurley | |
| 5,070,402 A | 12/1991 | Ishii et al. | |
| 5,113,189 A * | 5/1992 | Messer et al. | 341/143 |
| 5,142,690 A | 8/1992 | McMullan, Jr. et al. | |
| 5,155,590 A | 10/1992 | Beyers, II et al. | 358/86 |
| 5,208,854 A | 5/1993 | West, Jr. | |
| 5,225,902 A | 7/1993 | McMullan, Jr. | 358/86 |
| 5,235,619 A | 8/1993 | Beyers, II et al. | |

(Continued)

FOREIGN PATENT DOCUMENTS

WO    WO 00/25459    5/2000

(Continued)

OTHER PUBLICATIONS

U.S. Appl. No. 10/845,202, mailed Apr. 4, 2008, Non-Final Rejection.

(Continued)

*Primary Examiner* — Brian Pendleton
*Assistant Examiner* — Olugbenga O Idowu
(74) *Attorney, Agent, or Firm* — Maschoff Gilmore & Israelsen (57) ABSTRACT

An apparatus for and a method of transmitting analog return signals in a digital return path of a cable television system (CATV) is disclosed. In one embodiment, at a node of the CATV system, an analog CATV return signal is converted to a stream of digital samples at approximately 100 MHz. Signals outside of a desired frequency band are removed with a digital filter having predetermined filter coefficients. The resulting stream of digital samples is up-sampled to generate another stream of digital samples at a rate that is four times the center frequency of a predetermined frequency band. The resulting stream is then punctured to generate yet another stream with a data rate that is lower than 100 MHz. Zero samples are removed, and the remaining digital samples are serialized and converted to optical signals for transmission via an optical medium of the CATV return path. A reverse process at a hub or head end of the CATV return system restores the signals of the desired frequency band.

20 Claims, 12 Drawing Sheets

U.S. PATENT DOCUMENTS

| | | | |
|---|---|---|---|
| 5,243,651 A | 9/1993 | Parikh et al. | |
| 5,245,420 A | 9/1993 | Harney et al. | |
| 5,247,364 A | 9/1993 | Banker et al. | 358/191.1 |
| 5,251,324 A | 10/1993 | McMullan, Jr. | |
| 5,255,086 A | 10/1993 | McMullan, Jr. et al. | |
| 5,301,028 A | 4/1994 | Banker et al. | 348/570 |
| 5,303,295 A | 4/1994 | West et al. | |
| 5,313,467 A | 5/1994 | Varghese et al. | |
| 5,317,391 A | 5/1994 | Banker et al. | 348/6 |
| 5,319,454 A | 6/1994 | Schutte | |
| 5,323,462 A | 6/1994 | Farmer | |
| 5,357,276 A | 10/1994 | Banker et al. | 348/7 |
| 5,430,568 A | 7/1995 | Little et al. | 359/124 |
| 5,442,472 A | 8/1995 | Skrobko | 359/110 |
| 5,481,542 A | 1/1996 | Logston et al. | |
| 5,497,187 A | 3/1996 | Banker et al. | 348/6 |
| 5,499,241 A | 3/1996 | Thompson et al. | 370/73 |
| 5,505,901 A | 4/1996 | Harney et al. | |
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,657,333 A | 8/1997 | Ikekawa | |
| 5,680,394 A | 10/1997 | Bingham et al. | |
| 5,684,799 A | 11/1997 | Bigham et al. | |
| 5,719,867 A | 2/1998 | Borazjani | 370/436 |
| 5,719,872 A | 2/1998 | Dubberly et al. | 370/487 |
| 5,794,117 A | 8/1998 | Benard | |
| 5,826,167 A | 10/1998 | Jelinek et al. | 455/5.1 |
| 5,844,706 A | 12/1998 | Kohn et al. | |
| 5,854,703 A | 12/1998 | West, Jr. | 359/167 |
| 5,854,830 A | 12/1998 | Kenmochi | |
| 5,864,560 A | 1/1999 | Li et al. | |
| 5,907,363 A | 5/1999 | Botsford et al. | |
| 5,926,478 A | 7/1999 | Ghaibeh et al. | |
| 5,930,231 A | 7/1999 | Miller et al. | 370/210 |
| 5,963,352 A | 10/1999 | Atlas et al. | 359/161 |
| 5,963,557 A | 10/1999 | Eng | |
| 6,041,056 A | 3/2000 | Bigham et al. | |
| 6,041,066 A | 3/2000 | Meki et al. | |
| 6,091,932 A | 7/2000 | Langlais | |
| 6,161,011 A | 12/2000 | Loveless | 455/426 |
| 6,175,861 B1 | 1/2001 | Williams, Jr. et al. | |
| 6,178,446 B1 | 1/2001 | Gerszberg et al. | |
| 6,272,150 B1 | 8/2001 | Hrastar et al. | 370/486 |
| 6,279,158 B1 | 8/2001 | Geile et al. | |
| 6,356,369 B1 | 3/2002 | Farhan | 359/125 |
| 6,356,374 B1 | 3/2002 | Farhan | 359/180 |
| 6,373,611 B1 | 4/2002 | Farhan et al. | 359/180 |
| 6,389,075 B2 | 5/2002 | Wang et al. | |
| 6,417,949 B1 | 7/2002 | Farhan et al. | 359/173 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 * | 10/2002 | West, Jr. | 398/141 |
| 6,493,005 B1 * | 12/2002 | Wu | 715/804 |
| 6,505,271 B1 | 1/2003 | Lien et al. | |
| 6,519,067 B2 | 2/2003 | Farhan et al. | 359/180 |
| 6,523,177 B1 | 2/2003 | Brown | 725/121 |
| 6,535,715 B2 | 3/2003 | Dapper et al. | |
| 6,622,281 B1 * | 9/2003 | Yun et al. | 714/790 |
| 6,625,166 B2 | 9/2003 | Tsukamoto et al. | |
| 6,715,124 B1 | 3/2004 | Betts | |
| 6,751,269 B1 * | 6/2004 | Shalvi et al. | 375/298 |
| 6,754,221 B1 | 6/2004 | Whitcher et al. | |
| 6,798,790 B1 | 9/2004 | Enssle et al. | |
| 6,831,901 B2 | 12/2004 | Millar | |
| 6,898,256 B2 * | 5/2005 | Kaku et al. | 375/354 |
| 7,000,018 B1 | 2/2006 | Begis | |
| 7,035,355 B2 * | 4/2006 | Lais et al. | 375/341 |
| 7,131,024 B1 | 10/2006 | Venkata | |
| 7,222,358 B2 | 5/2007 | Levinson | |
| 7,257,328 B2 | 8/2007 | Levinson et al. | |
| 7,519,078 B2 | 4/2009 | Oyadomari et al. | |
| 2002/0073434 A1 * | 6/2002 | Pience | 725/119 |
| 2002/0085589 A1 | 7/2002 | Dravida | |
| 2002/0129379 A1 | 9/2002 | Levinson et al. | |
| 2002/0131426 A1 * | 9/2002 | Amit et al. | 370/401 |
| 2003/0016701 A1 | 1/2003 | Hinson | |
| 2003/0035445 A1 | 2/2003 | Choi | |
| 2005/0039103 A1 | 2/2005 | Azenko et al. | |
| 2006/0013194 A1 | 1/2006 | Baumann et al. | |

FOREIGN PATENT DOCUMENTS

| | | |
|---|---|---|
| WO | WO 0143441 | 6/2001 |
| WO | WO 01/52455 | 7/2001 |

OTHER PUBLICATIONS

U.S. Appl. No. 10/845,006, mailed Jun. 24, 2008, Non-Final Rejection.

U.S. Appl. No. 09/735,710, mailed Dec. 28, 2005, Non-Final Rejection.

U.S. Appl. No. 09/735,710, mailed Jun. 2, 2006, Non-Final Rejection.

U.S. Appl. No. 09/735,710, mailed Oct. 30, 2006, Final Rejection.

U.S. Appl. No. 09/735,710, mailed Apr. 9, 2007, Notice of Allowance.

U.S. Appl. No. 10/285,205, mailed Jan. 6, 2006, Non-Final Rejection.

U.S. Appl. No. 10/285,205, mailed Jul. 25, 2006, Final Rejection.

U.S. Appl. No. 10/285,205, mailed Jan. 22, 2007, Notice of Allowance.

U.S. Appl. No. 10/102,625, mailed Jun. 16, 2008, Non-Final Rejection.

United States Patent and Trademark Office, U.S. Appl. No. 10/845,006 Final Rejection mailed Dec. 23, 2008.

United States Patent and Trademark Office, U.S. Appl. No. 10/845,006, Non-Final Rejection mailed Aug. 7, 2009.

United States Patent and Trademark Office, U.S. Appl. No. 10/845,202, Notice of Allowance mailed Dec. 5, 2008.

United States Patent and Trademark Office, U.S. Appl. No. 10/291,208, Non-Final Rejection mailed Jul. 22, 2008.

United States Patent and Trademark Office, U.S. Appl. No. 10/291,208, Non-Final Rejection mailed May 27, 2009.

United States Patent and Trademark Office, U.S. Appl. No. 10/909,478, Non-Final Rejection mailed Mar. 27, 2008.

United States Patent and Trademark Office, U.S. Appl. No. 10/909,478, Non-Final Rejection mailed Oct. 1, 2008.

United States Patent and Trademark Office, U.S. Appl. No. 10/909,478, Final Rejection mailed Jun. 23, 2009.

United States Patent and Trademark Office, U.S. Appl. No. 10/102,625, Non-Final Rejection mailed Jun. 16, 2008.

United States Patent and Trademark Office, U.S. Appl. No. 10/102,625, Non-Final Rejection mailed Jan. 6, 2008.

U.S. Appl. No. 10/218,344, mailed Mar. 31, 2009, Non-Final Rejection.

U.S. Appl. No. 10/218,344, mailed Jan. 4, 2010, Final Office Action.

U.S. Appl. No. 10/218,344, mailed Jul. 8, 2010, Office Action.

* cited by examiner

DATA RATE COMPRESSION DEVICE FOR CABLE TELEVISION RETURN PATH USING BANDPASS PUNCTURING

The present application claims priority to, under 35 U.S.C. 119(e), U.S. Provisional Patent Application 60/357,071, filed Feb. 12, 2002, which is incorporated herein by reference.

BRIEF DESCRIPTION OF THE INVENTION

The present invention relates generally to cable television systems (CATV). More specifically, the present invention pertains to a method and system for lowering the data rate of digital return path links for a CATV hybrid fiber coax system.

BACKGROUND OF THE INVENTION

Cable television systems (CATV) were initially deployed so that remotely located communities were allowed to place a receiver on a hilltop and to use coaxial cable and amplifiers to distribute received signals down to the town that otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path." A good review of much of today's existing return path technology is contained in the book entitled *Return Systems for Hybrid Fiber Coax Cable TV Networks* by Donald Raskin and Dean Stoneback, hereby incorporated by reference as background information.

One innovation, which has become pervasive throughout the CATV industry over the past decade, is the introduction of fiber optics technology. Optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to connect the neighborhood nodes to homes, businesses and the like in a small geographical area.

Figure 1:
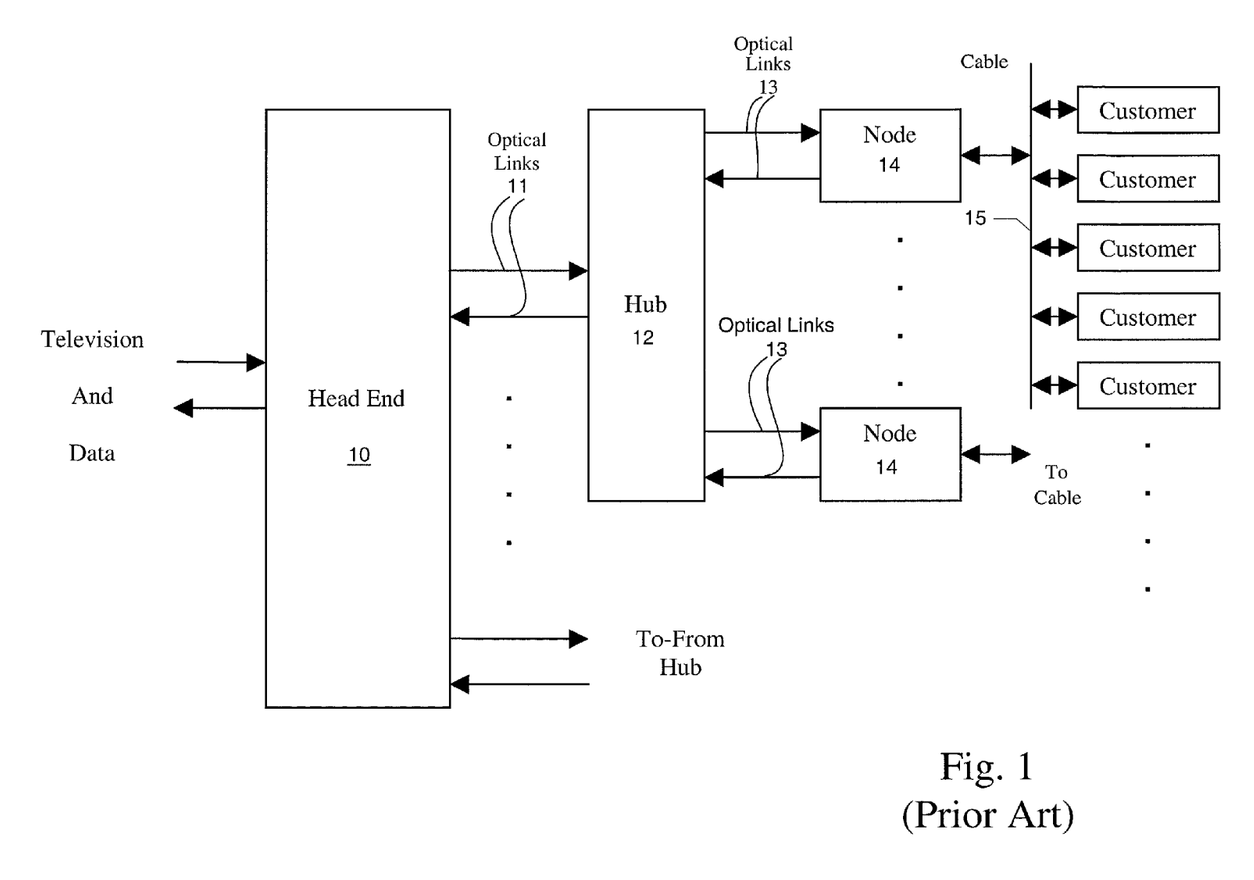
FIG. 1 shows the architecture of a cable television system.

FIG. 1 shows the architecture of a HFC cable television system. Television programming and data from external sources are sent to the customers over the "forward path." Television signals and data are sent from a head end 10 to multiple hubs 12 over optical link 11. At each hub 12, data is sent to multiple nodes 14 over optical links 13. At each node 14, the optical signals are converted to electrical signals and sent to customers over a coaxial cable 15. In the United States, the frequency range of these signals is between 55 to 850 MHz.

Data or television programming from the customer to external destinations, also known as return signals or return data, are sent over the "return path." From the customers to the nodes 14, return signals are sent over the coaxial cables 15. In the United States, the frequency range of the return signals is between 5 to 42 MHz. At the nodes 14, the return signals are converted to optical signals and sent to the hub 12. The hub combines signals from multiple nodes 14 and sends the combined signals to the head end 10.

Figure 2:
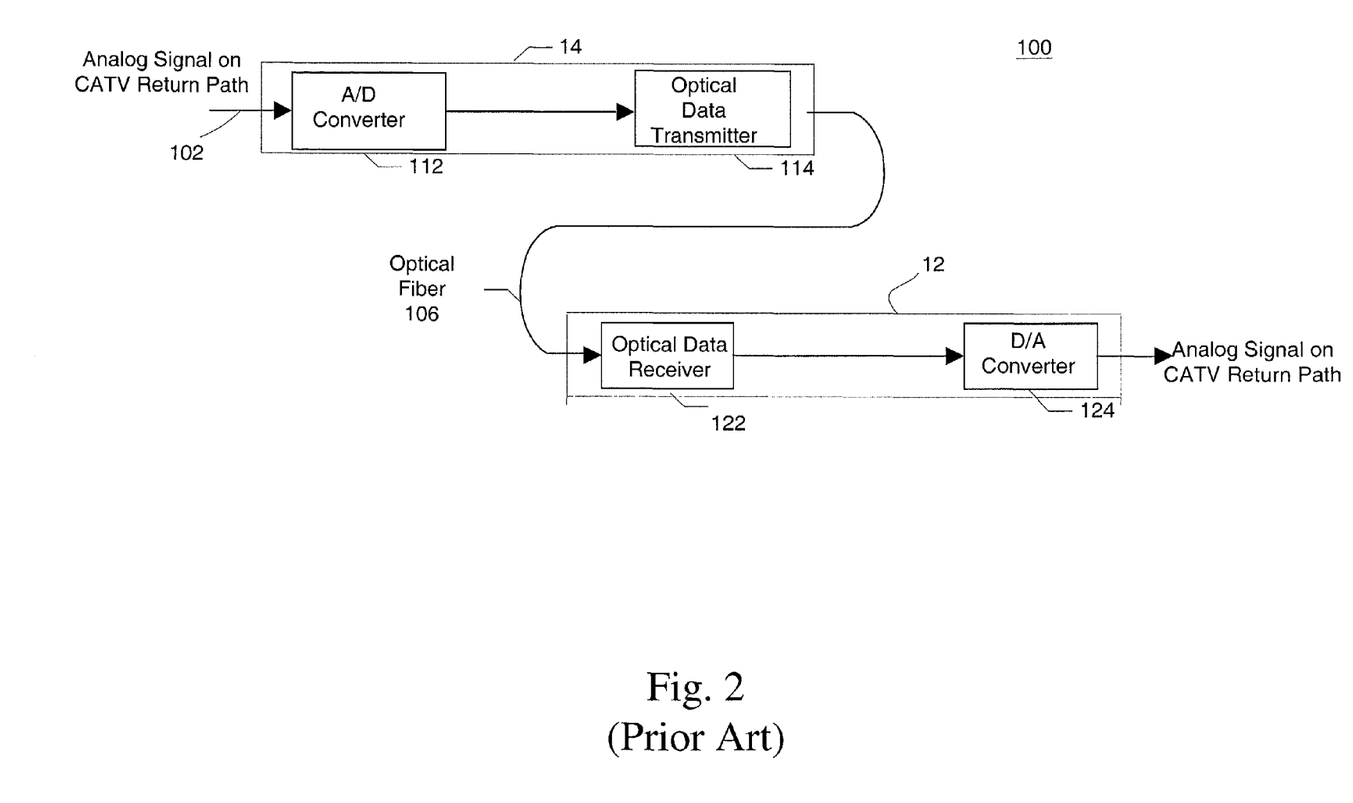
FIG. 2 is a block diagram of a cable television (CATV) digital return path of the prior art.

FIG. 2 is a block diagram of a digital return path 100 of a prior art HFC cable television system that uses conventional return path optical fiber links. As shown, analog return signals, which include signals generated by cable modems and set top boxes, are present on the coaxial cable 102 returning from the customer. The coaxial cable 102 is terminated at a node 14 where the analog return signals are converted to a digital representation by an A/D converter 112. The digital signal is used to modulate a optical data transmitter 114 and the resulting optical signal is sent over an optical fiber 106 to an intermediate or head end hub 12. At the hub 12, the optical signal is detected by an optical receiver 122, and the detected digital signal is used to drive a D/A converter 124 whose output is the recovered analog return signals.

The analog return signals present on the coaxial cable 102 are typically a collection of independent signals. In the United States, because the analog return signals are in the frequency range of 5 to 42 MHz, the sampling rate of the A/D converter is about 100 MHz, slightly more than twice the highest frequency in the band. A 10-bit A/D converter operating at a sampling rate of 100 MHz is typically used for digitizing the return signals. As a result, data will be output from the A/D converter 112 at a rate of about 1 Gbps. Further, the optical data transmitter 114 and the optical data receiver 122 must be capable of transmitting and receiving optical signals at a rate of 1 Gbps or higher. The high transmission data rate requires the use of expensive equipment, or short transmission distances, or both. Bandwidth limitations of the data transmission equipment also limits the number of analog return signals that can be aggregated for transmission on the same optical fiber.

Accordingly, there exists a need for a method of and system for lowering the data rate in the return path of a CATV system.

SUMMARY OF THE INVENTION

An embodiment of the present invention is an apparatus for and a method of transmitting analog return signals in a digital return path of a cable television system (CATV). In this embodiment, at a node of the CATV system, an analog CATV return signal is converted to a stream of digital samples at approximately 100 MHz. Signals outside of a desired frequency band are removed with a digital filter having predetermined filter coefficients. The resulting stream of digital samples is up-sampled to generate another stream of digital samples at a rate that is four times the center frequency of a predetermined frequency band. The resulting stream is then punctured to generate yet another stream with a data rate that is lower than 100 MHz. Zero samples (i.e., sample having a value of zero) are removed, and the remaining digital samples are serialized and converted to optical signals for transmission via an optical medium of the CATV return path. In one particular embodiment, the transported data stream has a data rate that is less than half of the 100 MHz data rate.

In furtherance of the present embodiment, at a hub or head end of the CATV system, the optical signals are converted to electrical signals and deserialized to form a stream of digital samples. Zeros samples are reinserted, and the resulting stream is filtered by a digital filter that has the same filter coefficients as the filter in the node of the CATV system. The filtered stream of digital samples are then up-sampled to a rate of approximately 100 MHz. The up-sampled stream is converted by a digital-to-analog converter to restore the signals in the desired frequency band.

BRIEF DESCRIPTION OF THE DRAWINGS

Other advantages and aspects of the present invention will be more readily apparent from the following description and appended claims when taken in conjunction with the accompanying drawings, in which:

DESCRIPTION OF THE PREFERRED EMBODIMENTS

Figure 3:
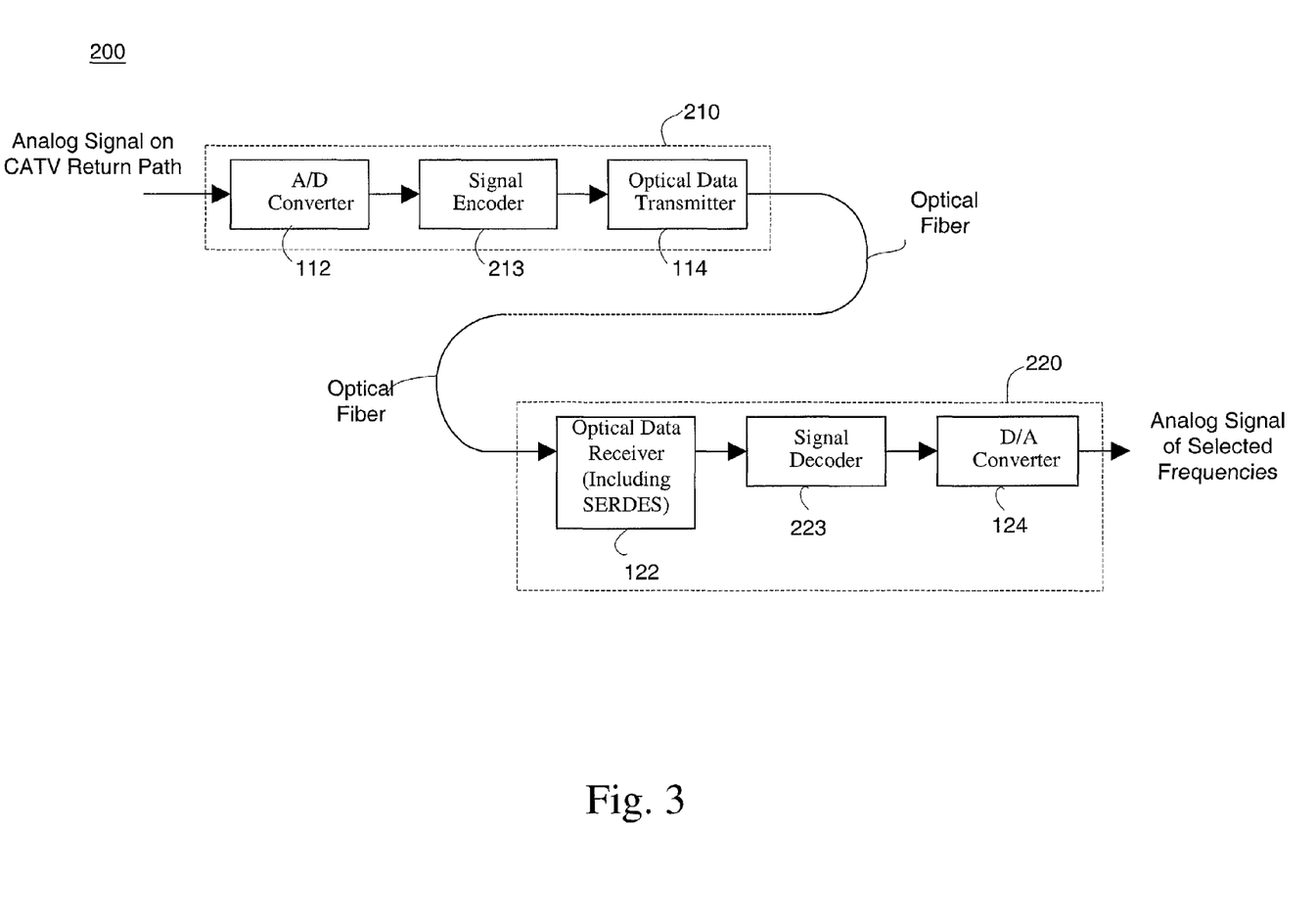
FIG. 3 is a block diagram of a CATV return path according to one embodiment of the present invention.

FIG. 3 is a block diagram depicting a CATV return path 200 according to one embodiment of the present invention. At the CATV return path transmitter 210, an A/D converter 112 receives an analog return signal from a co-axial cable 201 and generates a stream of data at a full sampling rate (e.g., 100 MHz). A signal encoder 213 encodes the output of the A/D converter 112 and generates another stream of data at a lower data rate. The low data rate output of the signal encoder 213 is provided to the optical data transmitter 114 for transmission to a hub 220 as optical signals. According to the present invention, the hub 220 can be an intermediate hub or a head end hub.

At the hub 220, an optical data receiver 122 receives the optical signals from the transmitter 210 and converts the signals to a low data rate data stream that is a replica of the data stream generated by the signal encoder 213. More specifically, the optical data receiver 122 preferably includes an optoelectronic receiver that receives the optical signals and converts the optical signals into a serial bit stream, and a deserializer for converting the serial bit stream into a stream of multiple-bit digital values (sometimes called samples). A signal decoder 223 receives and decodes the output of the optical data receiver 122 and generates a stream of data at a full sampling rate. The output of the decoder 223 is provided to the D/A converter 124 for conversion into analog signals. In this embodiment, the signal encoder 213 and signal decoder 223 enable digital data to be transmitted across the optical link at a lower rate than N*F bits per second (where N is the number of bits and F is the sampling frequency of the A/D converter 112). The entire spectrum of the analog return signal originally present on cable 201, however, is not recreated at the output of the hub 220. Only frequencies within a desired frequency band of the analog return signal are recovered at the hub 220.

Figure 4:
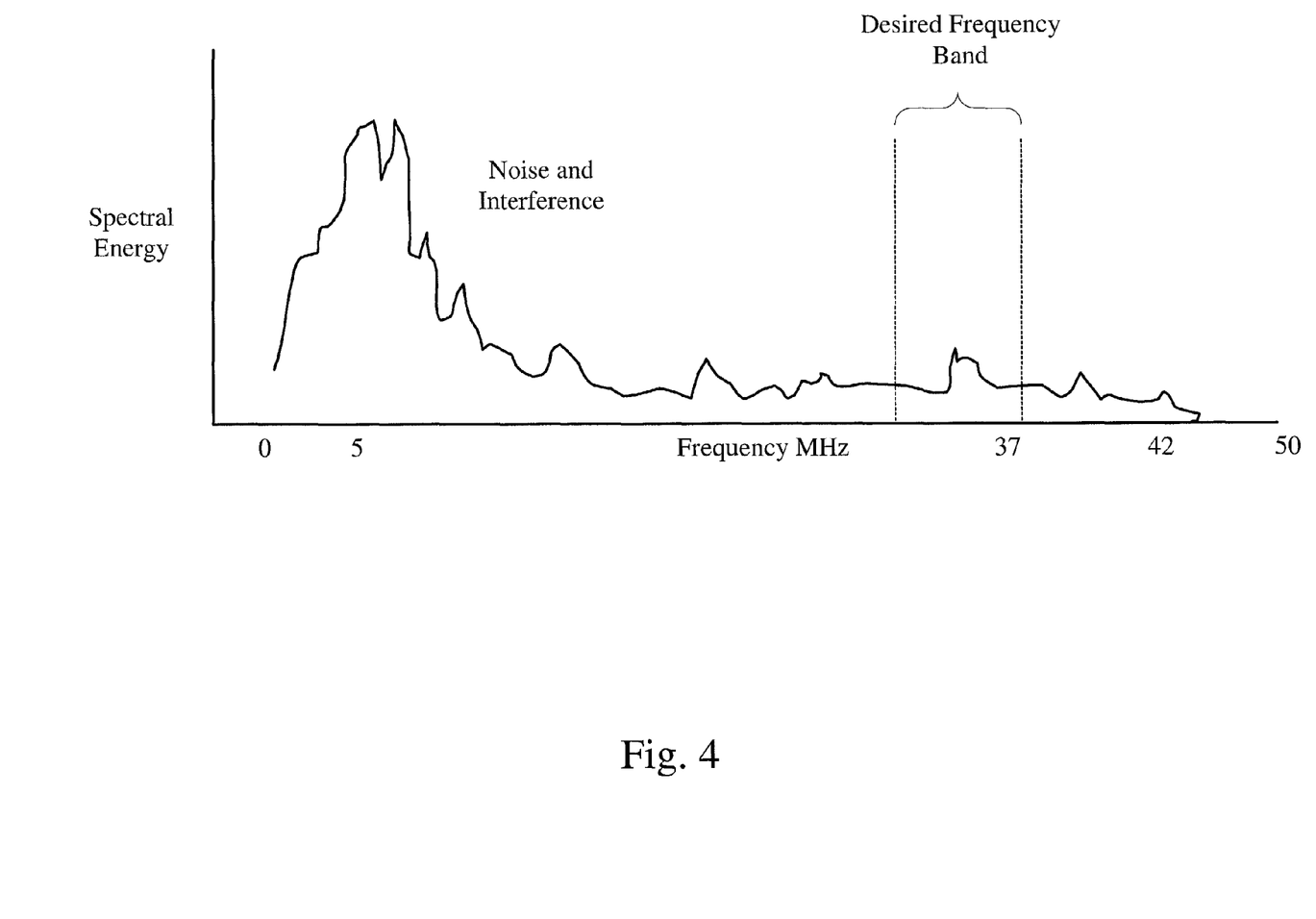
FIG. 4 illustrates a relationship between spectral energy and frequency of signals carried by a conventional CATV digital return path and a desired frequency band that is carried by a CATV digital return path of FIG. 3.

The analog return signal carried by the co-axial cable 201 is an analog signal with signal components from 5 to 42 MHz. FIG. 4 illustrates the spectral density of the signal components of a typical analog return signal. In prior art CATV systems, most or all of the signal components from 5 to 42 MHz are communicated via the return path to the head end. A typical sampling rate of the analog return signal is 100 MHz, which is higher than twice the highest frequency transmitted in the return path. In some CATV systems, users of the CATV return path only use specific portions of the return path spectrum. Thus, in those systems, only those portions of the return path spectrum carrying useful information need be transmitted from the node 210 to the hub 220. Other portions of the return path spectrum can be filtered out. In one particular embodiment as shown in FIG. 4, the desired signal is only in a portion of the return path spectrum approximately between 34 MHz and 40 MHz with a total bandwidth of approximately 6 MHz. When only a specific portion of the return path spectrum is transmitted, (e.g., the spectrum between 34 MHz and 40 MHz) the data rate of the optical link can be significantly reduced.

Figure 5:
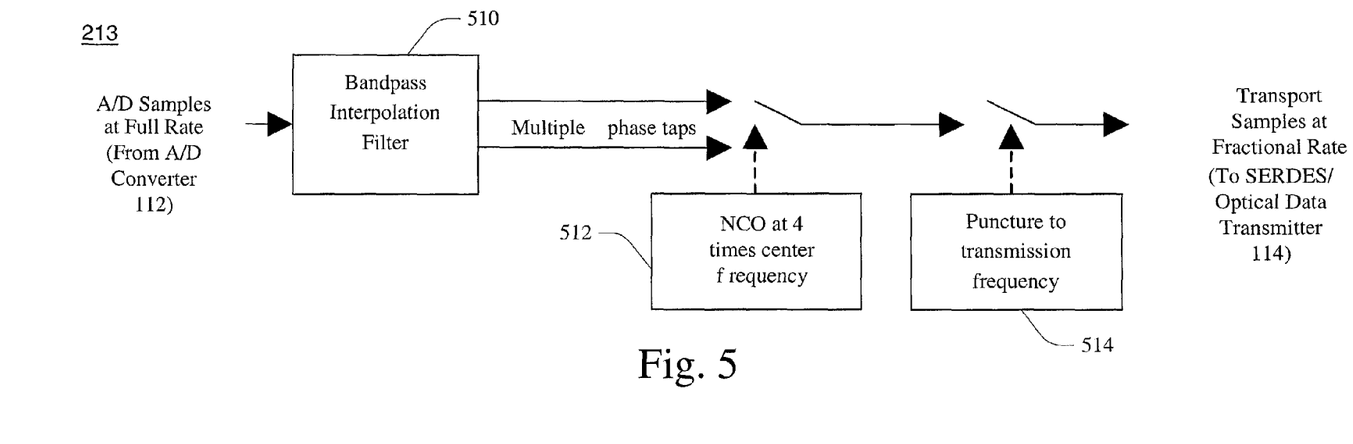
FIG. 5 illustrates an encoder that can be used in the CATV digital return path of FIG. 3.

According to one embodiment of the present invention, logic for transmitting a signal that embodies a specific portion of the return path spectrum is implemented in the signal encoder 213. One implementation of the signal encoder 213 is shown in FIG. 5. As shown, a stream of A/D samples at the Full Rate of 100 MHz is first filtered by a digital FIR (Finite Impulse Response) band-pass interpolation filter 510 to form a band-limited data stream. The filter rate of the bandpass interpolation filter 510 is chosen as the least common multiple of the Full Rate and an integer multiple (e.g. four times) of Center Frequency. As used herein, Center Frequency refers to the frequency approximately at the center of the frequency band to be retained. For example, if the frequency band to be retained is the band between 32-38 MHz, the Center Frequency will be approximately 35 MHz. The Center Frequency is preferably less than one half the Full Rate.

In the present embodiment, A/D samples enter the filter at the Full Rate (e.g., 100 MHz), and samples are read from the multiple phase taps of band-pass interpolation filter 510 at a rate that is four times (and more generally an integer multiple of) the Center Frequency to form another stream of samples. If the Center Frequency is 35 MHz, then samples are read from the band-pass interpolation filter 510 at a rate of 140 MHz, and the filter rate will be 700 MHz. In the present embodiment, the data rate at which samples are read from the output phase taps of the bandpass interpolation filter 510 is set by an NCO (Numerically Controlled Oscillator) 512.

With reference again to FIG. 5, the interpolated samples are then punctured at an odd integer rate by logic circuits 514. That is, samples are punctured at a rate of Center Frequency*4/k; where k is an odd integer. The value of k can be chosen as any odd number as long as the resulting sampling rate is less than twice the desired bandwidth (i.e., of the desired signal band). For a ⅓ puncture rate, only every third sample is retained. The other 2 of 3 of the samples are replaced by zeros. The retained samples are the Transport Samples. In the present embodiment, only the Transport Samples are sent to the optical data transmitter 114. The samples that are replaced by zeros (or, "punctured") are not sent over the optical link 11 to the hub 12 or head end 10.

Figure 6:
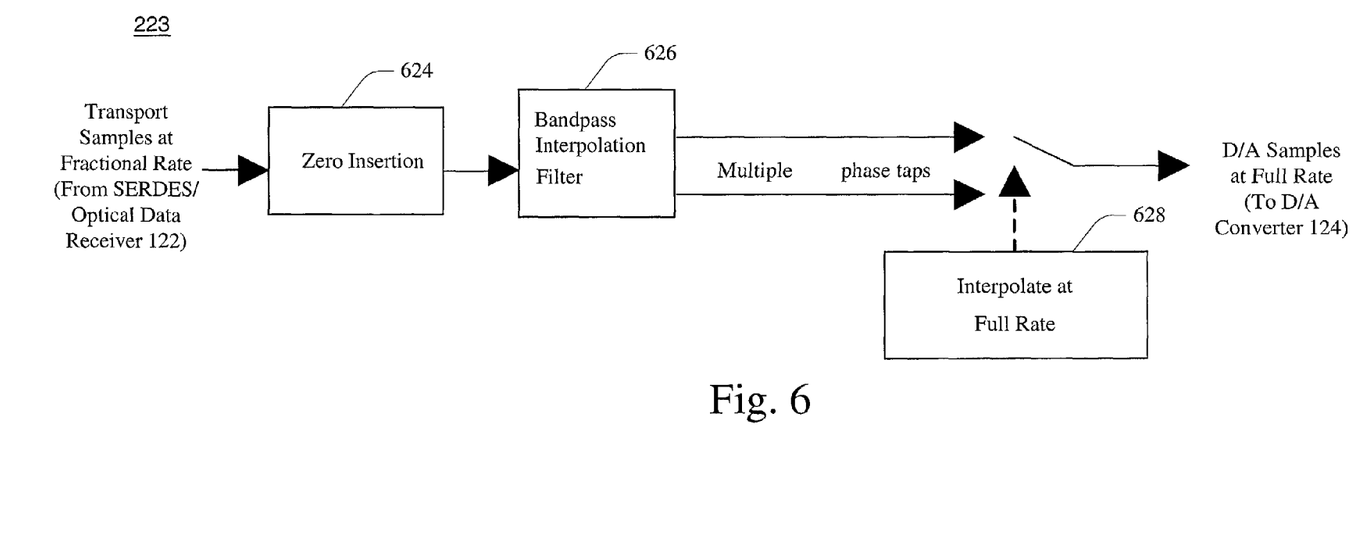
FIG. 6 illustrates a decoder that can be used in the CATV digital return path of FIG. 3.

Attention now turns to FIG. 6, which is a block diagram depicting an implementation of signal decoder 223 in accordance with an embodiment of the present invention. The signal decoder 223 is coupled to SERDES circuits of the optical data receiver 122 to receive the transport stream generated by node 210. As described above, the transport stream consists of punctured samples. That is, certain samples were replaced with zeros and were not transported. Thus, in the present embodiment, the zero-insertion logic 624 of the signal decoder 223 reinserts the zero samples in the transport stream to generate a "depunctured" or "restored" stream. The "depunctured" stream is filtered by a bandpass interpolation filter 626, and the output phase taps of the interpolation filter 626 are read (by a multiplexer or similar apparatus 628) at the Full Rate of 100 MHz to form an output data stream. The samples of the output data stream are then sent to the D/A converter 124 (FIG. 3) and an analog low pass output filter 230, which reconstruct the desired analog waveform. The low pass output filter preferably filters out signals significantly above the desired band of signals, so as to reduce or eliminate high frequency noise generated by the reconstruction of the desired signal from digital samples. For example, with a desired signal band of 34 to 40 MHz, the low pass output filter would preferably filter out signal above approximately 50 MHz.

Example Implementation

Figure 7:
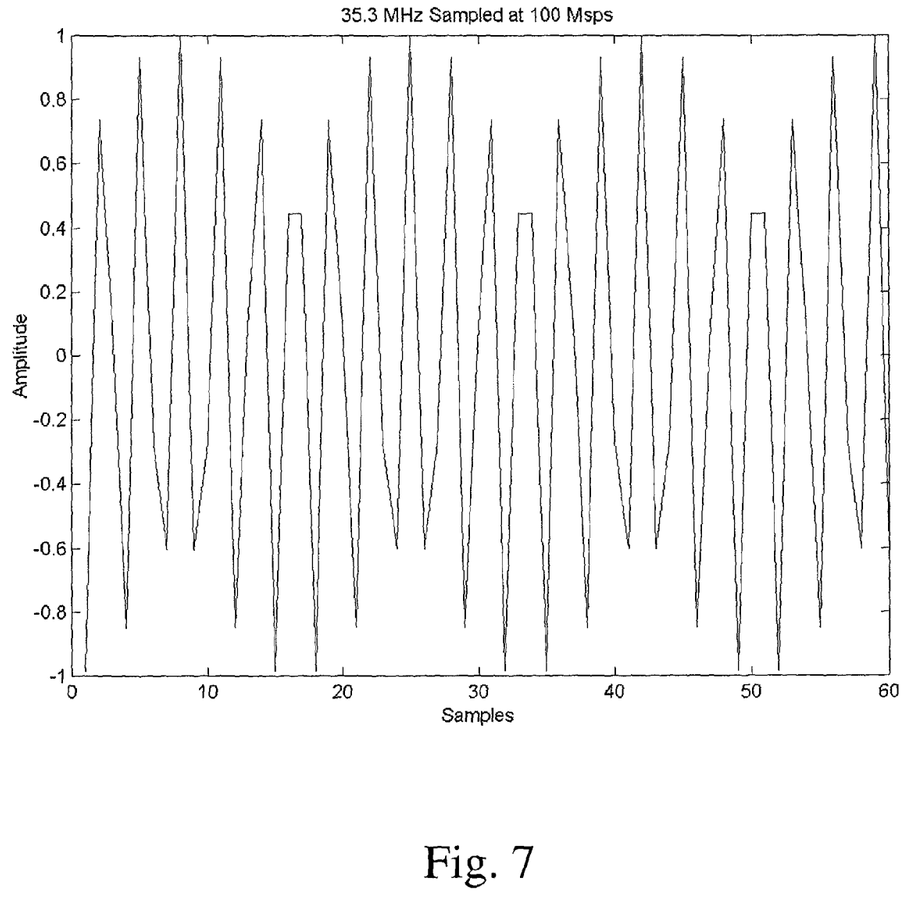
FIG. 7 illustrates samples of a 35.3 MHz sinusoidal waveform sampled at a 100 MHz rate.

Attention now turns to an example implementation that illustrates the principles of an embodiment of the present invention. In this example, a 35.3 MHz sinusoidal waveform sampled at a 100 MHz rate is used as the input signal. FIG. 7 shows the samples of the 35.3 MHz sinusoidal input signal sampled at a 100 MHz rate.

Figure 8:
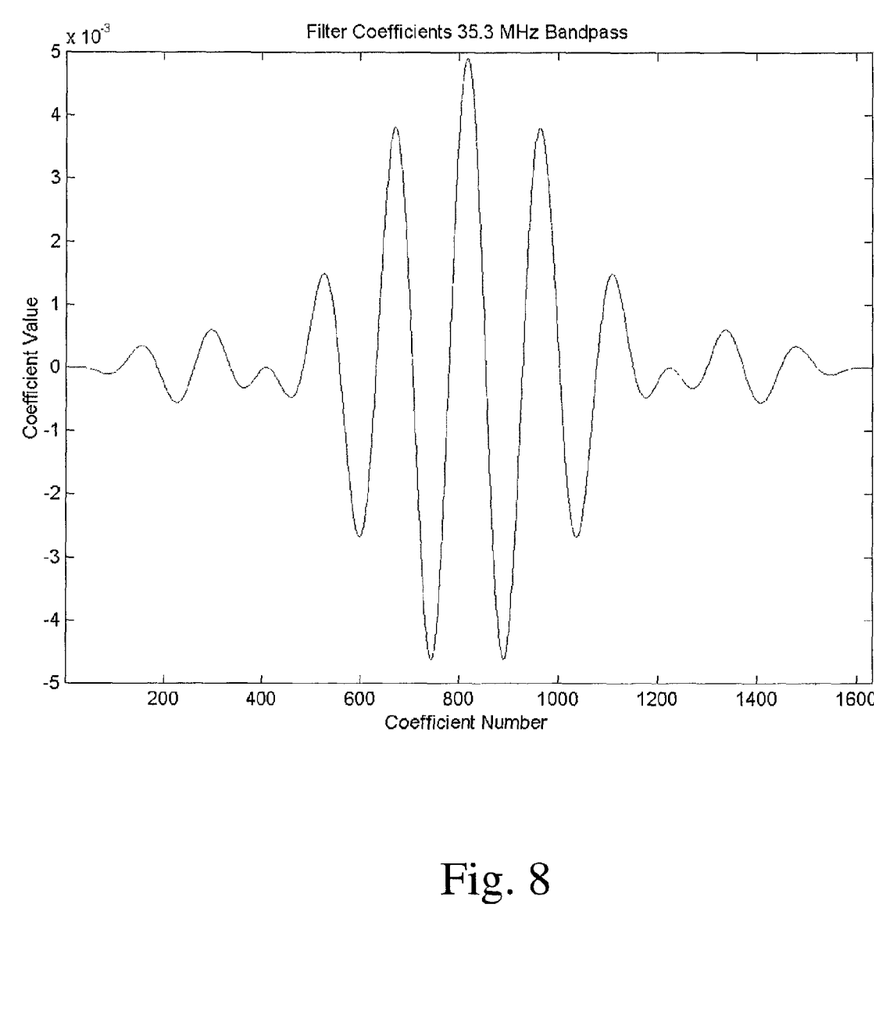
FIG. 8 illustrates the coefficients of the bandpass interpolation filter of FIG. 5 according to one embodiment of the present invention.
Figure 9:
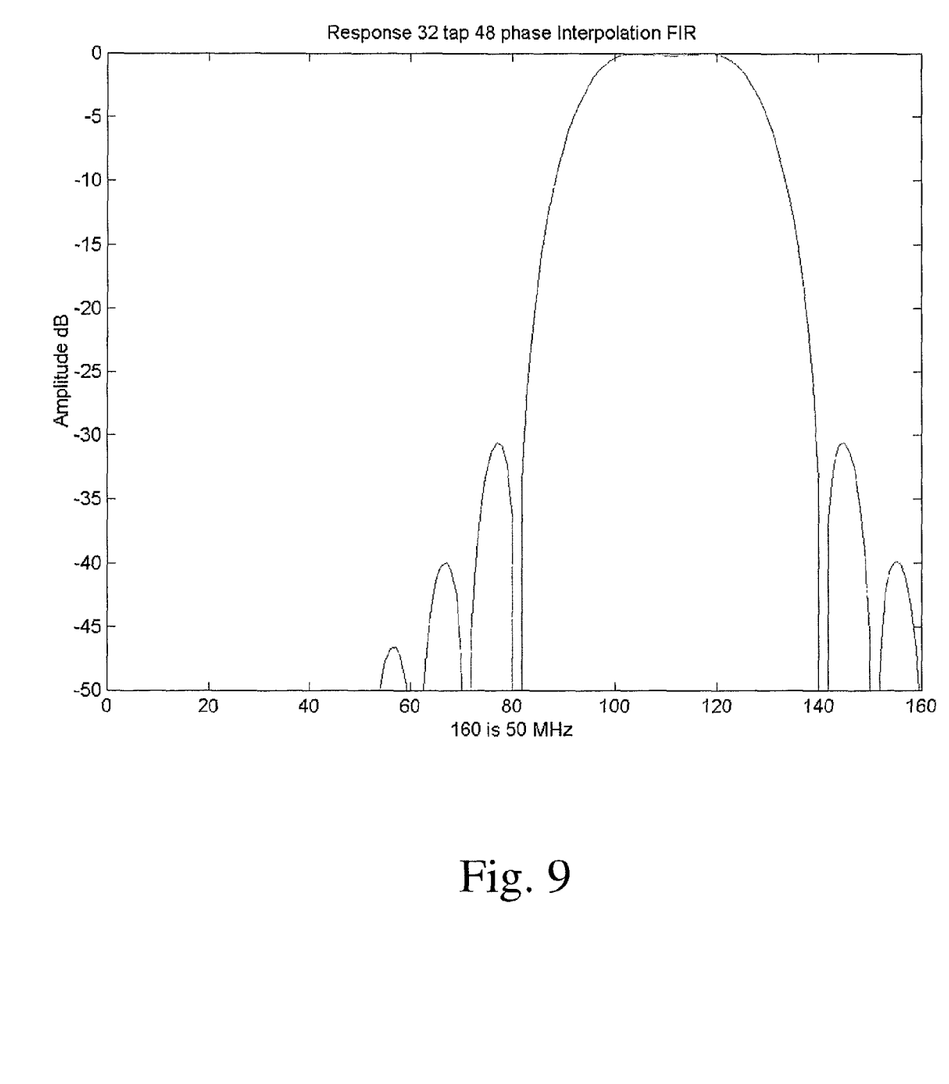
FIG. 9 illustrates the frequency response of the bandpass interpolation filter of FIG. 5 according to one embodiment of the present invention.

Further, in this example, the bandpass interpolation filter 510 of the signal encoder has thirty-four active taps with forty-eight phases. FIG. 8 shows the coefficients of the bandpass interpolation filter 510 in this particular example. The frequency response of the filter 510 in this particular example is shown in FIG. 9. The bandpass interpolation filter 510 processes the input signal allowing only the desired signals to pass. In this example, the 35.3 MHz sinusoidal input signal falls within the range of desired signals that are allowed to pass. (35.3 MHz corresponds to 112.96 on the horizontal scale of FIG. 9, and thus falls near the center of the region have 0 dB in amplitude attenuation.)

Figure 10:
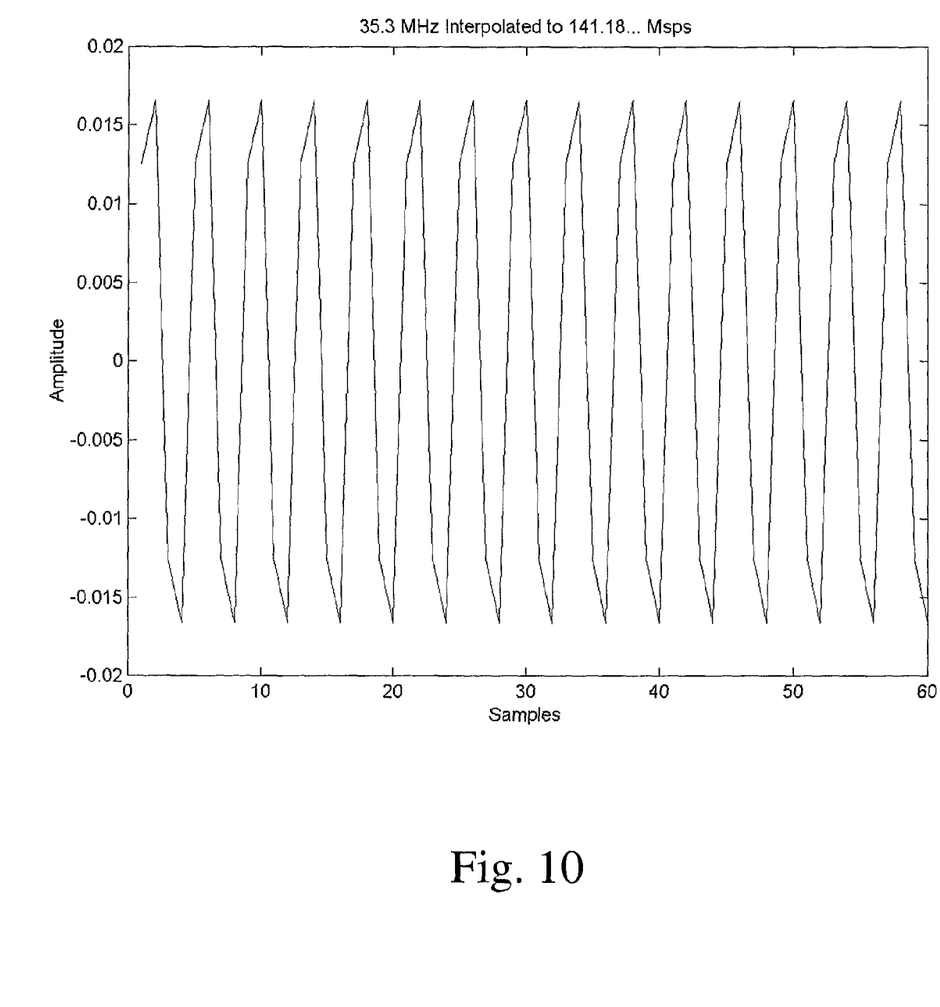
FIG. 10 illustrates the output of the bandpass interpolation filter of FIG. 5 when interpolated 48/34 times the input frequency or approximately 141.176 MHz.
Figure 11:
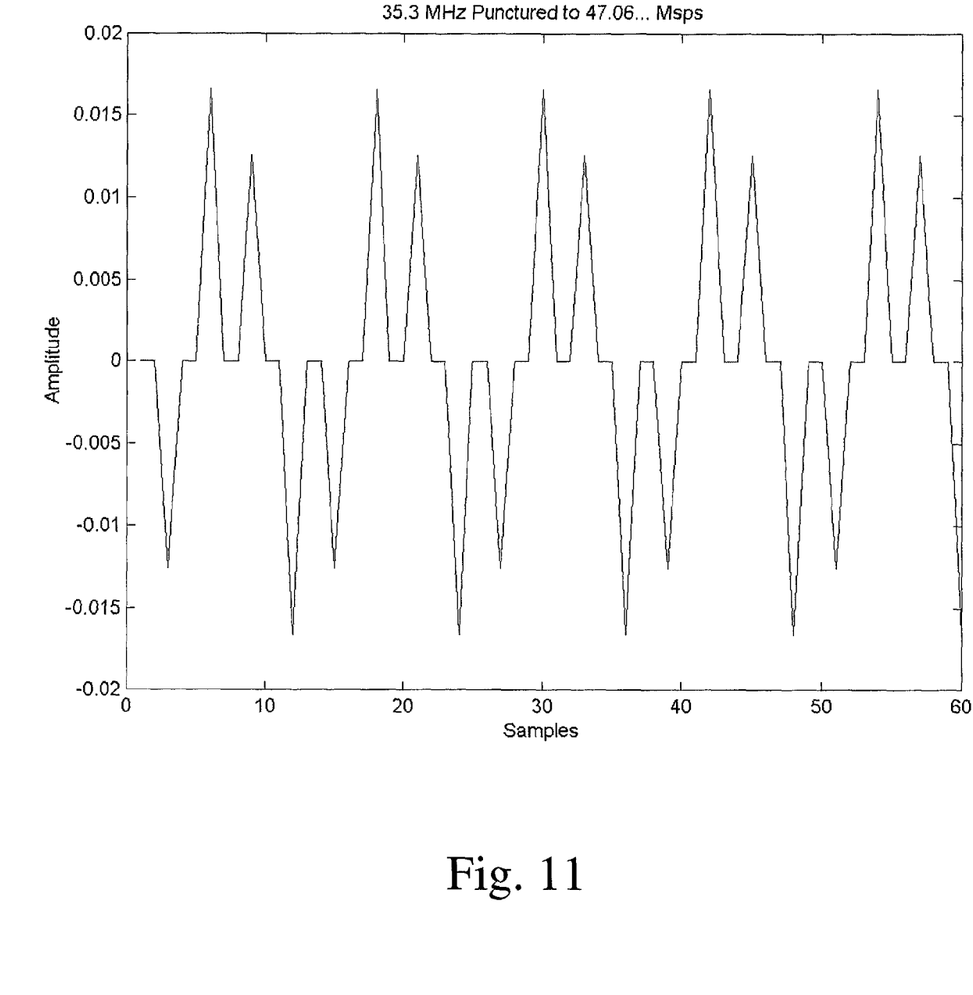
FIG. 11 illustrates the result of puncturing the output of the bandpass interpolation filter FIG. 5 according to one embodiment of the present invention.

In the present example the output of the filter 510 is interpolated 48/34 times the (100 MHz) input frequency or approximately 141.18 MHz (which is approximately four times the center frequency of 35.3 MHz (35.3 MHz*4=141.2 MHz)), resulting in the interpolated samples of FIG. 10. The interpolated samples are then punctured to ⅓ the sample rate of 141.18 MHz or 47.06 MHz. FIG. 11 shows the samples after puncturing. The punctured samples are set to zero in the FIG. 11. Only the non-zero samples are transported to the receiver. Thus, the transport data rate is reduced from 100 MHz to approximately 47.06 MHz.

Figure 12:
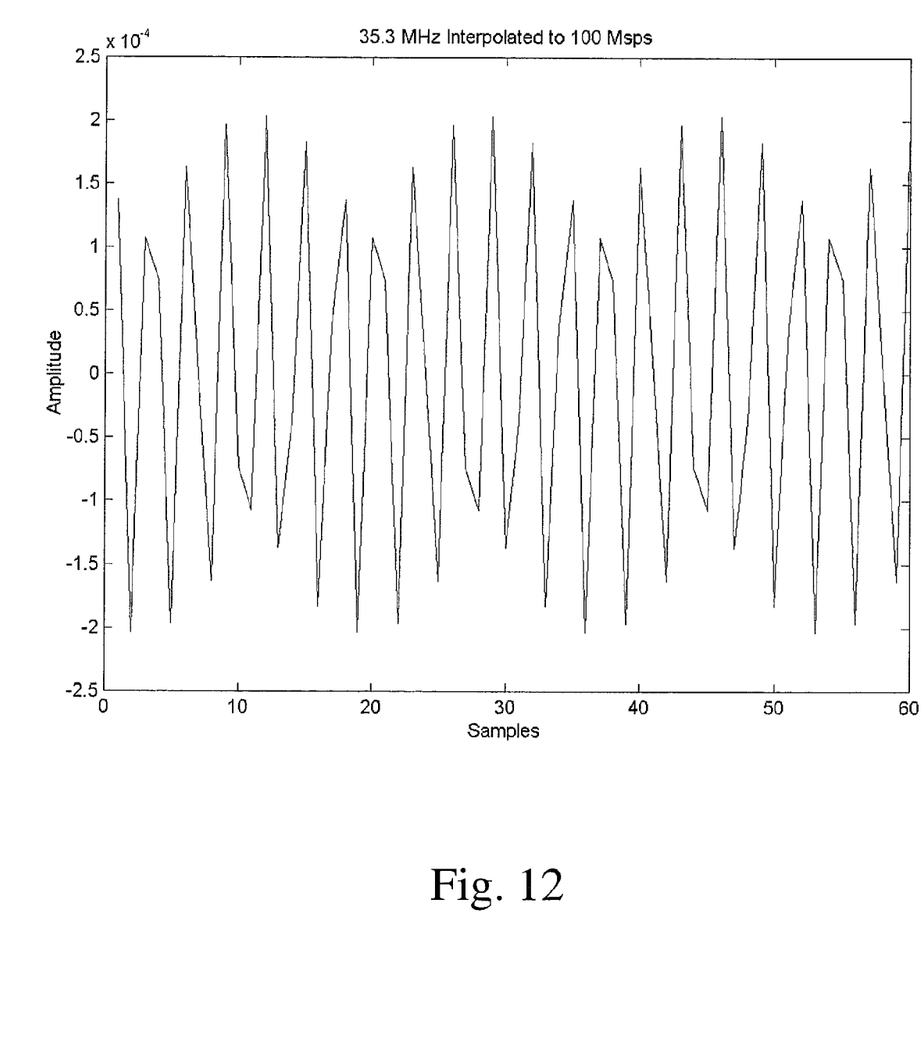
FIG. 12 illustrates the result of interpolating the filter output of the bandpass filter of FIG. 6 to the full rate of approximately 100 MHz according to one embodiment of the present invention.

At the receiver, the zeros in the punctured data stream are reinserted. The resulting data stream is filtered in the bandpass interpolation filter 626, which has the same filter coefficients as the bandpass interpolation filter 510. The bandpass interpolation filter 626, however, is used with forty-eight active taps and thirty-four phases. The filter output is computed at the full rate of 100 MHz resulting in the samples shown in FIG. 12. The resulting samples are similar to the input samples (FIG. 7) with only the phase shift of the system components.

Figure 13:
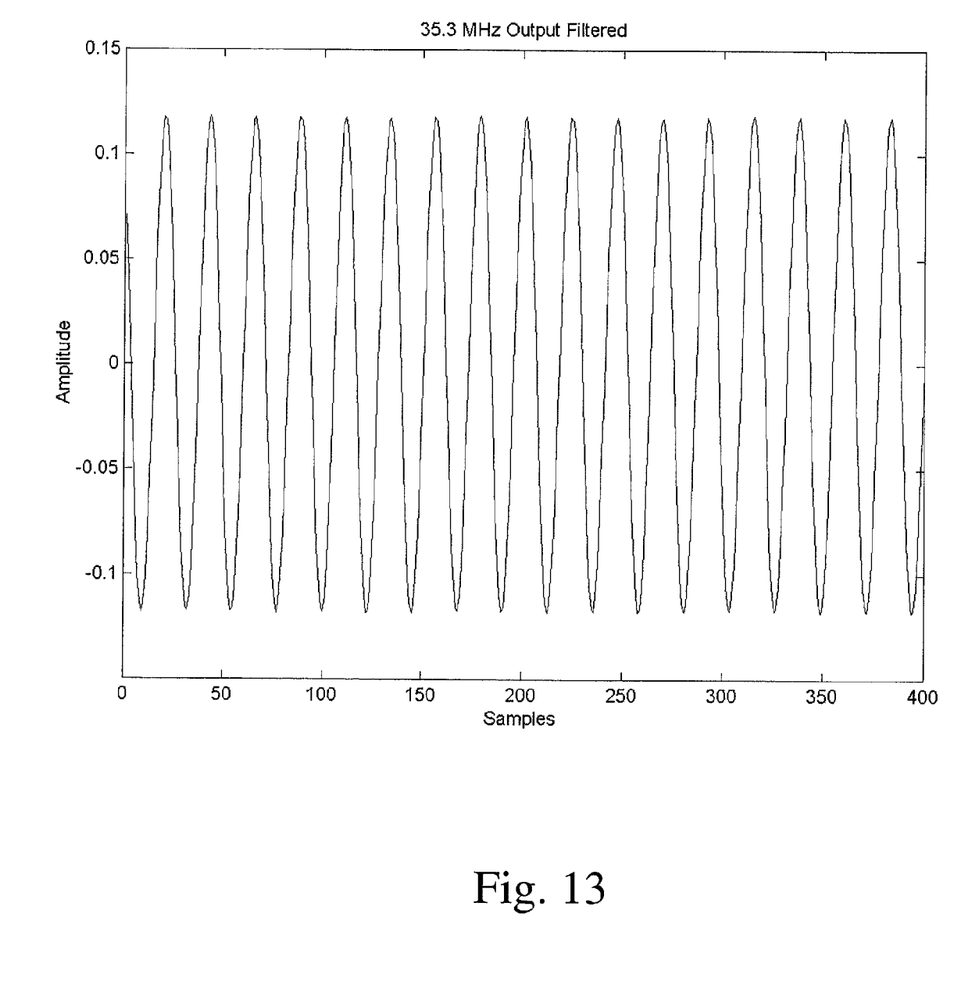
FIG. 13 illustrates the result of converting the output of the bandpass interpolation filter of FIG. 6 and low-pass filtering the analog signal according to one embodiment of the present invention.

The output of the bandpass interpolation filter 626 is passed to the D/A converter 124 (FIG. 3) and filtered by an analog low pass filter 230 (FIG. 3), resulting in the output of FIG. 13.

Preferred embodiments of the present invention and best modes for carrying out the invention have thus been disclosed. While the present invention has been described with reference to a few specific embodiments, the description is illustrative of the invention and is not to be construed as limiting the invention. Various modifications may occur to those skilled in the art without departing from the true spirit and scope of the invention. It should also be noted that some embodiments of the present invention described above can be implemented by hardware logic (e.g., Field Programmable Gate Array(s)). In addition, a person skilled in the art would realize upon reading the present disclosure that portions of the present invention can be implemented as computer executable programs executable by a digital signal processor. Further, although the embodiments described above use finite impulse response (FIR) digital filters for rate conversion, a person skilled in the art would realize upon reading the present disclosure that other embodiments of the invention can use infinite impulse response digital filters and variable time update periods.

What is claimed is:

1. A signal encoder comprising:
    a bandpass interpolation filter configured to receive a first stream of digital samples from an analog-to-digital converter and to substantially remove signals outside of a predetermined frequency band between 32 and 38 MHz, the first stream of digital samples being representative of an analog cable television return path signal having a frequency range of between 5 and 42 MHz that is sampled at a first data rate;
    up-sampling logic configured to up-sample outputs of the bandpass interpolation filter and to generate a second stream of digital samples at a second data rate higher than the first data rate; and
    puncturing logic configured to puncture the second stream of digital samples and to generate a third stream of digital samples at a third data rate for transmission over a cable television return path, the third data rate being lower than the first data rate.

2. The signal encoder of claim 1, wherein the second data rate is a predetermined integer multiple of a center frequency of the predetermined frequency band.

3. The signal encoder of claim 1, wherein the up-sampling logic comprises a numerically controlled oscillator coupled to multiple phase taps of the bandpass interpolation filter.

4. The signal encoder of claim 2, wherein the center frequency is less than one half of the first data rate.

5. The signal encoder of claim 1, wherein the puncturing logic selectively replaces digital samples of the second stream with zeros according to a predetermined odd integer rate.

6. A device for use in a cable television return path, comprising:
- an analog-to-digital converter configured to convert an analog return signal having a frequency range of between 5 and 42 MHz to a first stream of digital samples at a first data rate;
- a bandpass interpolation filter configured to receive the first stream of digital samples and to substantially remove signals outside of a predetermined frequency band between 32 and 38 MHz;
- up-sampling logic configured to up-sample outputs of the bandpass interpolation filter and to generate a second stream of digital samples at a second data rate higher than the first data rate;
- puncturing logic configured to puncture the second stream of digital samples and to generate a third stream of digital samples at a third data rate that is lower than the first data rate;
- a serializer configured to convert the third stream of digital samples to a serial bit stream; and
- an optical transmitter driven by the serial bit stream to generate an optical signal for transmission in optical medium of the return path of the cable television system.

7. The device of claim 6, wherein the second data rate is a predetermined integer multiple of a center frequency of the predetermined frequency band.

8. The device of claim 6, wherein the up-sampling logic comprises a numerically controlled oscillator coupled to multiple phase taps of the bandpass interpolation filter.

9. The device of claim 6, wherein the center frequency is less than one half of the first data rate.

10. A signal decoder comprising:
- zero-insertion logic configured to insert zeros in a first stream of digital samples representative of an analog cable television return path signal having a frequency range of between 5 and 42 MHz received over a cable television return path according to a predetermined rate to produce a second stream of digital samples;
- a bandpass interpolation filter having predetermined filter coefficients configured to filter the second stream to generate a third stream of digital samples having a predetermined frequency band between 32 and 38 MHz; and
- up-sampling logic configured to up-sample the third stream of digital samples to form an output stream of digital samples at an output data rate higher than that of the first stream of digital samples.

11. The signal decoder of claim 10, wherein the output data rate is approximately 100 MHz.

12. The signal decoder of claim 10, wherein the up-sampling logic comprises a numerically controlled oscillator coupled to multiple phase taps of the bandpass interpolation filter.

13. A device for use in a cable television return path, comprising:
- an optical data receiver configured to receive an optical signal from an optical medium representative of an analog cable television return path signal having a frequency range of between 5 and 42 MHz and to convert the optical signal to a serial bit stream;
- a deserializer configured to convert the serial bit stream into a first stream of digital samples each having a plurality of bits;
- zero-insertion logic configured to insert zeros in the first stream of digital samples according to a predetermined rate to produce a second stream of digital samples; and
- a bandpass interpolation filter having predetermined filter coefficients configured to filter the second stream to generate a third stream of digital samples having a predetermined frequency band between 32 and 38 MHz;
- up-sampling logic configured to up-sample the third stream of digital samples to form an output stream of digital samples at an output data rate higher than that of the first stream of digital samples; and
- a digital-to-analog converter configured to convert the output stream of digital samples to an analog signal.

14. The device of claim 13, wherein the output data rate is approximately 100 MHz.

15. The device of claim 13, wherein the up-sampling logic comprises a numerically controlled oscillator coupled to multiple phase taps of the bandpass interpolation filter.

16. A method of transmitting analog return signals in a digital return path of a cable television system, the method comprising:
- converting an analog return signal having a frequency range of between 5 and 42 MHz to a first stream of digital samples at a first data rate;
- filtering the first stream of digital samples to substantially remove signals outside of a predetermined frequency band with a first digital filter having predetermined filter coefficients;
- up-sampling the filtered stream of digital samples to generate a second stream of digital samples at a second data rate, the second data rate being a predetermined multiple of a center frequency of a predetermined frequency band between 32 and 38 MHz;
- puncturing the second stream of digital samples at a predetermined odd integer rate to generate a third stream of digital samples; and
- converting the third stream of digital samples to an optical signal for transmission in the return path of the cable television system.

17. The method of claim 16, further comprising:
- converting the optical signal to a fourth stream of digital samples; inserting zeros in the fourth stream of digital samples according to the predetermined odd integer rate to generate a fifth stream of digital samples;
- filtering the fifth stream of digital samples with a second digital filter having the predetermined filter coefficients;
- up-sampling the filtered stream of digital samples to an output data rate; and
- converting the up-sampled stream of digital samples to an analog signal.

18. A signal encoder comprising:
- means for bandpass filtering a first stream of digital samples representative of an analog cable television return path signal having a frequency range of between 5 and 42 MHz from an analog-to-digital converter to substantially remove signals outside of a predetermined frequency band between 32 and 38 MHz, the first stream of digital samples being representative of an analog cable television return path signal that is sampled at a first data rate;
- means for up-sampling outputs of the bandpass interpolation filter to generate a second stream of digital samples at a second data rate higher than the first data rate; and
- means for puncturing the second stream of digital samples to generate a third stream of digital samples at a third data rate for transmission over a cable television return path, the third data rate being lower than the first data rate.

19. A signal decoder comprising:
means for inserting zeros in a first stream of digital samples received over a cable television return path representative of an analog cable television return path signal having a frequency range of between 5 and 42 MHz according to a predetermined rate to produce a second stream of digital samples;
means for bandpass filtering the second stream to generate a third stream of digital samples to substantially remove signals outside of a predetermined frequency band between 32 and 38 MHz; and
means for up-sampling the third stream of digital samples to form an output stream of digital samples at an output data rate higher than that of the first stream of digital samples.

20. The device of claim 6, wherein the puncturing logic punctures at least two out of every three bits in the second stream whereby the third data rate is at most one third of the second data rate at a predetermined odd integer rate.

* * * * *

UNITED STATES PATENT AND TRADEMARK OFFICE
CERTIFICATE OF CORRECTION

| | | |
|---|---|---|
| PATENT NO. | : 8,156,535 B2 | Page 1 of 1 |
| APPLICATION NO. | : 10/102619 | |
| DATED | : April 10, 2012 | |
| INVENTOR(S) | : Sage | |

It is certified that error appears in the above-identified patent and that said Letters Patent is hereby corrected as shown below:

ON THE TITLE PAGE:

Item (73), under "Assignee", in Column 1, Line 1, delete "Finsar Corporation" and insert
-- Finisar Corporation --, therefor.

Signed and Sealed this
Sixteenth Day of October, 2012

David J. Kappos
*Director of the United States Patent and Trademark Office*